United States Patent
Ohnishi et al.

(10) Patent No.: US 7,611,631 B2
(45) Date of Patent: Nov. 3, 2009

(54) INDIUM ADSORBENT AND INDIUM FRACTIONING METHOD

(75) Inventors: Akifusai Ohnishi, Osaka (JP); Nobuaki Fujiwara, Osaka (JP); Hideki Doi, Osaka (JP); Toyokazu Matsunami, Osaka (JP); Hiroshi Tsubota, Osaka (JP); Toshiaki Muratani, Osaka (JP); Shoji Nishikawa, Osaka (JP); Shinichi Yamasaki, Osaka (JP); Takamichi Honma, Osaka (JP)

(73) Assignees: Aquatech Corporation, Osaka (JP); Sharp Kabushiki Kaisha, Osaka (JP)

( * ) Notice: Subject to any disclaimer, the term of this patent is extended or adjusted under 35 U.S.C. 154(b) by 273 days.

(21) Appl. No.: 11/631,898

(22) PCT Filed: Jul. 7, 2005

(86) PCT No.: PCT/JP2005/012578

§ 371 (c)(1),
(2), (4) Date: Jan. 8, 2007

(87) PCT Pub. No.: WO2006/006497

PCT Pub. Date: Jan. 19, 2006

(65) Prior Publication Data

US 2008/0038188 A1 Feb. 14, 2008

(30) Foreign Application Priority Data

Jul. 9, 2004 (JP) ............................. 2004-203611
Dec. 13, 2004 (JP) ............................. 2004-360396

(51) Int. Cl.
*C02F 1/42* (2006.01)
*C02F 1/28* (2006.01)
*B01D 15/08* (2006.01)
*C01G 15/00* (2006.01)
*C08F 12/28* (2006.01)

(52) U.S. Cl. ................... 210/684; 210/656; 210/502.1; 210/198.2; 423/624; 526/310

(58) Field of Classification Search .............. 210/500.1, 210/660, 656, 661, 198.2, 502.1, 684
See application file for complete search history.

(56) References Cited

U.S. PATENT DOCUMENTS 4,384,957 A * 5/1983 Crowder et al. ............. 210/656

(Continued)

FOREIGN PATENT DOCUMENTS

JP 37-9551 7/1962

(Continued)

OTHER PUBLICATIONS

Sigma-Aldrich. Material Safety Data Sheet: DOWEX 1×8-200 Ion-Exchange Resin, CAS 69011-19-4. Apr. 21, 2004, 4 pages.*

*Primary Examiner*—Krishnan S Menon
*Assistant Examiner*—Katherine Zalasky
(74) *Attorney, Agent, or Firm*—The Webb Law Firm

(57) ABSTRACT

The invention provides an indium adsorbent that can cause indium to be adsorbed, and a simple and inexpensive indium fractioning method for isolating and recovering high-purity indium from an acid solution whose primary component is hydrochloric acid and that contains indium. A primary component of the indium adsorbent is an anion-exchange resin that has a crosslinked structure produced by the copolymerization of styrene or acrylamide and divinylbenzene, and at least one of a quaternary ammonium group and a tertiary ammonium group, and that is provided with an acid-adsorbing ability. An acid solution whose primary component is hydrochloric acid and that includes indium is brought into contact with the anion-exchange resin to cause indium to be adsorbed to the anion-exchange resin.

15 Claims, 7 Drawing Sheets

U.S. PATENT DOCUMENTS

| | | | | |
|---|---|---|---|---|
| 4,565,673 A | * | 1/1986 | Kataoka et al. | 423/112 |
| 5,925,253 A | * | 7/1999 | Pohl et al. | 210/635 |
| 6,162,648 A | * | 12/2000 | Maloney et al. | 436/178 |
| 2002/0153521 A1 | * | 10/2002 | Hattori et al. | 257/1 |

FOREIGN PATENT DOCUMENTS

| | | | |
|---|---|---|---|
| JP | 62-176914 | | 8/1987 |
| JP | 03-082720 | * | 8/1989 |
| JP | 4-142500 | | 5/1992 |
| JP | H6-248370 | | 9/1994 |
| JP | 2000-169991 | | 6/2000 |
| JP | 2000212658 | | 8/2000 |
| JP | 2002069684 | | 3/2002 |
| JP | 2002308622 | | 10/2002 |

\* cited by examiner

INDIUM ADSORBENT AND INDIUM FRACTIONING METHOD

TECHNICAL FIELD

The present invention relates to indium adsorbents for adsorbing indium, and indium fractioning methods for fractioning indium from acid solutions that have hydrochloric acid as a primary component and that contain indium.

BACKGROUND ART

In recent years, much of the indium in Japan has been used in transparent conducting films in the form of indium-tin oxide (hereinafter, ITO) or indium-zinc oxide (hereinafter, IZO), and this constitutes approximately 70% of the entire market for indium (when recycled indium is included, this becomes almost 80%).

On the other hand, the flat panel display (hereinafter, FPD) industry, which uses transparent conducting films, has recently experienced a dramatic increase in the demand for thin-type and large-type televisions, in addition to the demand for liquid crystal displays for personal computers. The tightening of lead restrictions by the EU is expected to increase the need for indium due to the increased demand for leadless solder that is made from low melting-point alloys that include indium.

Market trends point toward a rise in the price of indium, and it is foreseeable that the situation will become a "competition" to secure raw indium.

On this backdrop, there are increasing opportunities to recycle indium, and one might say that the recycling of indium is more than just a simple environmental technology, but rather a "material recovery" technology that has important economic value.

Some conventional examples of the technology for recycling indium include eluting an ITO target, etc. with acid and then isolating and recovering the indium by removing impurity metal ions through a sulfide method (for example, see Patent Document 1) or a hydroxide method (for example, see Patent Document 2), or with a chelate resin (for example, see Patent Document 3), or through solvent extraction (for example, see Patent Document 4).

Indium that has been isolated and recovered by an above method is then refined by an electric field refining method (for example, see Patent Document 5) or the like.

Patent Document 1: JP 2000-169991A
Patent Document 2: JP 2002-69684A
Patent Document 3: JP 2002-308622A
Patent Document 4: JP 2000-212658A
Patent Document 5: JP H6-248370A

DISCLOSURE OF INVENTION

Problem to be Solved by the Invention

However, these conventional methods require a large quantity of an alkaline agent in order to adjust the pH when isolating and recovering the indium. Further, indium that has been isolated and recovered as above requires separate refining before it may be recycled.

Moreover, these conventional methods are technologies primarily for recovering unused indium from an ITO target, for example, and the indium adhered to sputtering devices, and very little attention has been given to the recovery of indium from the glass substrates of used products or defective parts, for example, in the manufacturing process. In particular, there was also the problem that impurities become mixed in with the indium adhered to sputtering devices when adhered material is rubbed off and recovered from the sputtering device or chamber.

On the other hand, the isolation, recovery, and recycling of indium from the etching waste liquid of FPD panels and conducting films have been carried out sparsely to date, and in order to recycle this as a valuable item that has a high product value, high-purity indium is needed.

The present invention was proposed in light of the foregoing problems, and it is an object thereof to solve the problem of providing an indium adsorbent that can adsorb indium, and a simple and inexpensive indium fractioning method for isolating and recovering high-purity indium from an acid solution whose primary component is hydrochloric acid and that contains indium.

Means for Solving Problem

A characteristic constitution of the indium adsorbent according to the invention for achieving the above object is that its primary component is an anion-exchange resin that has a crosslinked structure produced by the copolymerization of styrene or acrylamide and divinylbenzene, and at least one of a quaternary ammonium group and a tertiary ammonium group, and that is provided with an acid-adsorbing ability.

That is, with this constitution, it is possible to selectively adsorb and separate indium through contact with an acid solution whose primary component is hydrochloric acid and that includes indium.

Consequently, with the indium adsorbent according to the invention, it is possible to fraction off indium simply and inexpensively.

A first characteristic means of the indium fractioning method according to the invention for achieving the above object involves bringing an acid solution that has hydrochloric acid as a primary component and that contains indium into contact with an anion-exchange resin that has a crosslinked structure produced by the copolymerization of styrene or acrylamide and divinylbenzene, and at least one of a quaternary ammonium group and a tertiary ammonium group, and that is provided with an acid-adsorbing ability, so as to cause indium to adsorb to the anion-exchange resin.

That is, with this means, indium can be adsorbed to the anion-exchange resin, and thus by bringing an acid solution whose primary component is hydrochloric acid and that includes indium into contact with the anion-exchange resin, it is possible to fraction off material that does not adsorb to the anion-exchange resin.

Consequently, it is possible to simply and inexpensively separate indium from an acid solution that contains indium.

A second characteristic means of the indium fractioning method according to the invention is that after indium has been adsorbed to the anion-exchange resin, the anion-exchange resin is brought into contact with water so as to desorb the indium from the anion-exchange resin, yielding an indium recovery liquid.

That is, with this means, by bringing the anion-exchange resin to which indium has been adsorbed into contact with water it is possible to cause the indium to desorb from the anion-exchange resin, and thus it is possible to obtain indium in the form of an indium recovery liquid.

The indium can be simply and inexpensively separated from an acid solution whose primary component is hydrochloric acid and that includes indium.

A third characteristic means of the indium fractioning method according to the invention is that the acid concentration of the effluent after contact with the anion-exchange resin is measured, and based on the change in its concentration, an acid recovery liquid and the indium recovery liquid are fractioned off.

That is, with this means, by measuring the acid concentration it is possible to fraction off an indium recovery liquid with a high indium concentration, and thus indium can be recovered with ease. In addition to the recovery of indium, it is also possible to recover and reuse the acid as the acid recovery liquid, and thus a more inexpensive recovery method can be attained.

A fourth characteristic means of the indium fractioning method according to the invention is that the pH of the indium recovery liquid is adjusted to recover the indium as indium hydroxide.

That is, with this means, it is possible to carry out fractioning by adjusting the pH, even when other metals are mixed in with the indium adsorbed to the anion-exchange resin, and thus high-purity indium can be recovered with ease.

A fifth characteristic means of the indium fractioning method according to the invention is that the indium hydroxide that has been recovered is dried or eluted with acid.

That is, with this means, it is possible to provide indium that is high-purity and that is in a form that is easily handled.

A sixth characteristic means of the indium fractioning method according to the invention is that the acid solution is at least one of a solution obtained by eluting, with an acid whose primary component is hydrochloric acid, a conducting film of a flat panel display, ITO attached matter or IZO attached matter that occur due to sputtering, or leadless solder that includes indium, an etching waste liquid of the conducting film, and a wash waste liquid of a chamber.

That is, with this means, it is possible to simply and inexpensively recover indium from the conducting film of flat panel displays, ITO attached matter or IZO attached matter that occur due to sputtering, leadless solder, the etching waste liquid of the conducting film, and the wash waste liquid of the chamber, which to date has been difficult due to the numerous impurities.

A seventh characteristic means of the indium fractioning method according to the invention is that the acid solution is a mixture acid solution that includes nitric acid.

That is, with this means, it is possible to increase the indium concentration of the indium recovery liquid, and thus the indium recovery rate can be increased further.

An eighth characteristic means of the indium fractioning method according to the invention is that the acid recovery liquid is used for eluting at least one of a conducting film of a flat panel display, ITO attached matter or IZO attached matter that occur due to sputtering, or leadless solder that includes indium, or is used for washing a chamber.

That is, with this means, the acid recovery liquid can be used for fractioning off the indium, and thus indium can be fractioned off more inexpensively.

BEST MODE FOR CARRYING OUT THE INVENTION

The indium adsorbent according to the invention has as a primary component an anion-exchange resin that has a crosslinked structure produced by the copolymerization of styrene or acrylamide and divinylbenzene, and at least one of a quaternary ammonium group and a tertiary ammonium group, and that is provided with an acid-adsorbing ability.

The indium fractioning method of the invention involves bringing an acid solution that has hydrochloric acid as a primary component and that contains indium into contact with an anion-exchange resin that has a crosslinked structure produced by the copolymerization of styrene or acrylamide and divinylbenzene, and at least one of a quaternary ammonium group and a tertiary ammonium group, and that is provided with an acid-adsorbing ability, so as to adsorb the indium onto the anion-exchange resin. Then, after the indium has been adsorbed onto the anion-exchange resin, the anion-exchange resin is brought into contact with water in order to desorb the indium from the anion-exchange resin.

By doing this, it is possible to separate and recover high-purity indium from an acid solution that has hydrochloric acid as a primary component and that contains indium.

The inventors found that by bringing an acid solution that has hydrochloric acid as a primary component and that contains indium into contact with an anion-exchange resin that has a crosslinked structure produced by the copolymerization of styrene or acrylamide and divinylbenzene, and at least one of a quaternary ammonium group and a tertiary ammonium group, and that is provided with an acid-adsorbing ability, it is possible to adsorb indium onto the anion-exchange resin. The result of keen investigations led to the finding that, as shown in FIG. 1(a), indium that is present in an acid solution that has hydrochloric acid as a primary component becomes an indium chloro complex made from indium and hydrochloric acid and that behaves as an anion, and adsorbs specifically to the anion-exchange resin.

The anion-exchange resin to which indium has been adsorbed is then brought into contact with water to desorb the indium, and since the indium is adsorbed as a chloride complex as mentioned above, first the highly-acidic hydrochloric acid is desorbed and then the indium is desorbed. That is, as shown in FIG. 2, the indium chloro complex becomes an indium aquo chloro complex due to the conversion of the ligand from chloride ion to water molecules brought about by the drop in the chloride concentration that accompanies the desorption of the hydrochloric acid, in the process becoming a cation that is repelled by the anion-exchange resin (its adsorption ability drops) and is desorbed. For this reason, the acid concentration of the water after the water has been brought into contact with the anion-exchange resin to which the indium and the acid are adsorbed is measured continuously, and from the change in its concentration it is possible to fraction off an acid recovery liquid with a high acid concentration and an indium recovery liquid with a high indium concentration.

It should be noted that FIG. 2 shows a case in which the indium aquo chlorocomplex becomes a cation and is desorbed from the anion-exchange resin, but it is not absolutely necessary for the indium aquo chlorocomplex to become a cation, and for example even in a case where it is ionically neutral, the strength of the ionic bond with the anion-exchange resin drops and thus desorption becomes possible.

If nitric acid is present in the hydrochloric acid solution, then, as shown in FIG. 1(b), the nitrate ion causes a water molecule to be substituted for some of the chloride ions of the ligand, so that the indium exists as an indium aquo chloro complex. Thus, the substitution of water molecules for the chloride ions of the ligand is accelerated after the hydrochloric acid has desorbed, and this allows the concentration of indium in the indium recovery liquid to be increased further. From this standpoint, it is preferable for the acid solution whose primary component is hydrochloric acid and that contains indium to be a mixture acid solution that contains nitric acid. It should be noted that in the case of a mixture acid solution that contains nitric acid, from the standpoint of the ease of indium adsorption and desorption, it is desirable for the ratio of hydrochloric acid and nitric acid to be 1 to 15 mol nitric acid per 100 mol hydrochloric acid.

There are no particular restrictions regarding the indium adsorbent according to the invention, and any indium adsorbent may be selected, as long as it has as a primary component an anion-exchange resin that has a crosslinked structure produced by the copolymerization of styrene or acrylamide and divinylbenzene, and at least one of a quaternary ammonium group and a tertiary ammonium group, and that is provided with an acid-adsorbing ability. The crosslinked structure may include compounds other than styrene or acrylamide and divinylbenzene, and it may be in a gel form or a porous form. Quaternary ammonium groups and tertiary ammonium groups are functional groups with the ability to adsorb acid, and as long as the indium adsorbent of the invention includes either one of these, it can favorably provide the anion-exchange resin with an acid-adsorbing ability. Preferable quaternary ammonium groups are a trimethyl ammonium group and a dimethyl ethanol ammonium group, and a preferable tertiary ammonium group is a dimethyl ammonium group, but there is no limitation to these, and it is possible to introduce a single or a plurality of types of quaternary ammonium groups and tertiary ammonium groups. It is also preferable for the ions of the anion-exchange resin to be in the form of Cl or OH ions.

From the standpoint of the acid-adsorbing ability, it is preferable for the mean particle size of the resin to be about 150 to 250±25 μm and it is preferable for the total exchange quantity to be at least 1 meq/mL and more preferably at least 1.2 meq/mL.

There are no particular limitations regarding the water that is brought into contact with the anion-exchange resin in order to desorb the indium, and it can be either purified water, pure water, neutral water such as ion exchanged water, or alkaline water. In other words, it is only necessary that the water is contacted with the anion-exchange resin so that the indium can be desorbed.

Using the indium adsorbent according to the invention, a method of isolating and recovering indium from the ITO conducting film of a FPD panel is described with reference to the drawings as an example of an embodiment of the method for separating indium by fractioning.

The recovery of indium from a FDP panel includes an indium adsorption process and an indium recovery process, as shown in FIG. 3. These processes are described below.

Indium Adsorption Process

The indium adsorption process is a process in which the indium in an FPD panel is adsorbed to the indium adsorbent.

First, the FPD panel is cut or ground to pieces not more than 10 mm, and preferably not more than 1 mm (S1), and the ITO conducting film in the FPD panel is eluted with an acid whose primary component is hydrochloric acid (S2). Then, impurities such as glass and film in the solution are removed by filtration or the like (S3).

The cutting or grinding of the FPD panel that is carried out at this time is for the purpose of facilitating elution of the ITO conducting film with the acid. As long as the conducting film can be eluted with the acid, there are no particular limitations regarding the size of the cut or ground FPD panel. It should be noted that conventional methods that are known to the public can be used to carry out the cutting and grinding.

As long as the acid with hydrochloric acid as its primary component for eluting the FPD panel is capable of eluting ITO, there are no particular limitations regarding it, and it can be hydrochloric acid alone or a mixture acid that also includes nitric acid, sulfuric acid, perchloric acid, phosphoric acid, hydrofluoric acid, or an organic acid. It should be noted that from the perspective of efficiently desorbing the indium as above, preferably it is a mixture acid that includes nitric acid.

The acid concentration can be chosen freely, and for example, in a case in which an FPD panel is to be eluted, for safety reasons it is preferable that the acid concentration of the solution is 10 to 25%. The higher the acid temperature, the more readily the elution will occur, but in terms of safety and the ease of handling it is preferable that the temperature is about 30 to 90° C. and more preferably about 40 to 80° C. It should be noted that if a mixture acid that includes nitric acid is used, there is a risk that the acid will form a passive state in high temperature regions, and thus a temperature of 40 to 60° C. is particularly preferable.

The acid solution containing the ITO and impurity metals that make up the FPD panel thus obtained is passed through a column packed with the indium adsorbent of the invention. Indium is adsorbed to the indium adsorbent of the invention along with acid and tin, and impurity metals such as aluminum pass through the column as metal salts. In this way, indium and tin can be separated from the impurity metals.

Then, an alkaline agent such as sodium hydroxide is added to the solution that contains the impurity metals that have been passed through the column to adjust the pH to about 8 (S4), thereby precipitating the impurity metals as a sludge of hydroxides, for example. The sludge is removed from the solution by a solid-liquid separation (S5), and the solution can be discharged as is or used in the subsequent indium recovery process (S6).

Indium Recovery Process

The indium recovery process is a process for desorbing and recovering indium from the indium adsorbent.

In the indium recovery process, water is passed through the column packed with indium adsorbent that was processed in the indium adsorption process in the same direction in which the solution was passed through. By doing this, the acid that has adsorbed to the indium adsorbent can be eluted off. First, the column is connected to the acid recovery line, and an acid recovery liquid with a high acid concentration is fractioned off and recovered while continuously measuring the acid concentration of the recovery liquid that has passed through the column using a conductivity meter or the like (S7). The acid recovery liquid that has been recovered can be reused as the acid for eluting the FPD panel, for example (S8). Once the acid concentration has increased to a value that is larger than a fixed value (S7), the column is disconnected from the acid recovery line and reconnected to the indium recovery line, and the indium recovery liquid is recovered. It is also possible to later change the line again to separately recover the fraction of the low acid recovery liquid in which the indium is low concentration. In this case, the low acid recovery liquid can be reused as the water that is passed through the column in this process.

It should be noted that is it not absolutely necessary to fraction off the acid recovery liquid, and it is also possible for the liquid that has passed through the column to be recovered as the indium recovery liquid for recovering the indium from the beginning.

Since the indium recovery liquid contains indium and tin, first an alkaline agent such as sodium hydroxide is added to the indium recovery liquid to adjust the pH to about 1.5 to 2.5 (S9). As a result, the tin precipitates as tin sludge in the form of tin hydroxide and can be separated from the liquid (S10).

Once the tin sludge has been removed, the pH of the indium recovery liquid is adjusted to about 4.5 to 5.5 (S11). By doing this, it is possible to obtain a high-purity indium sludge made of indium hydroxide. The indium sludge that has been obtained is separated from the liquid (S12), then washed with wash water and the water removed, then either dried or reeluted with acid so that it is recovered as an approximately 5% indium solution. The solution from which the indium sludge has been removed can be discharged as is or used for indium recovery (S13).

The above method was described with regard to a method for fractioning indium from the ITO conducting film of an FPD panel, but this is not a limitation, and for example, as the acid solution, instead of the ITO conducting film of an FPD panel it is possible to use a solution produced by an acid elution of an IZO conducting film, the ITO attached matter or the IZO attached matter that occur due to sputtering, or leadless solder that includes indium, the etching waste liquid of the conducting film, or the wash waste liquid of the chamber. In particular, since impurities such as other metals and glass become mixed in when rubbing off the ITO attached matter or the IZO attached matter that becomes attached to the machine or the glass, for example, at the time of sputtering, the indium adsorbent and the indium fractioning method of the invention can be favorably adopted also when indium is to be separated from such ITO attached matter. It should be noted that if the ITO attached matter, for example, is eluted under the same conditions as in the case of an ITO conducting film, then additional time will be required because the particles are large in size.

If indium is to be fractioned off from an acid solution that contains the zinc of an IZO conducting film or IZO attached matter, then, since the indium recovery liquid that is recovered in S7 also contains zinc, by adjusting the pH to about 9 before or after recovering indium from the indium recovery liquid it is possible to precipitate the zinc as zinc sludge in the form of zinc hydroxide and then separate this solid from the liquid.

EXAMPLES

Working examples of the indium fractioning method according to the invention are described below.

Working Example 1, Comparative Examples 1 through 4

Analysis of the Adsorption Mechanism 1000 g of cullet obtained by cutting/grinding a liquid crystal panel into approximately 5-mm size units were separately placed in 500 mL hydrochloric acid (3.5% HCl), 500 mL sulfuric acid (9.8% $H_2SO_4$), and 500 mL nitric acid (6% $HNO_3$), respectively, and these were each agitated for 60 minutes at 80° C., after which the insoluble matter was removed by filtration, yielding an acid solution with eluted ITO. This acidic solution and the etching waste liquid of the ITO conducting film were each passed through a column ($\phi$20 mm×250 mm H) packed with 60 g of a gel anion-exchange resin that has a crosslinked structure produced by copolymerizing styrene and divinylbenzene and also has trimethylammonium groups at a rate of LV=1.5 m/h, after which pure water was passed through the column in the same direction that the solution was passed through. The ion concentration after the solution and the water had been fed through was measured, and the results are shown in FIGS. 4 through 8.

FIGS. 4 through 6 show the behavior of the indium and the acid when the ITO hydrochloric acid solution, sulfuric acid solution, and nitric acid solution were brought into contact with the anion-exchange resin. FIG. 7 shows the behavior of the silica and the acid when the ITO hydrochloric acid solution is brought into contact with the anion-exchange resin. FIG. 8 shows the behavior of iron and the acid when the etching waste liquid is brought into contact with the anion-exchange resin.

From these results, it was clear from FIG. 4 that the elution obtained by eluting the indium with hydrochloric acid is adsorbed to the anion-exchange resin by passing the hydrochloric acid solution through the column, and then is favorably desorbed by passing water through the column. The manner in which the indium is desorbed after the hydrochloric acid has desorbed resembles the behavior of the silica shown in FIG. 7, whereas with the product eluted with sulfuric acid, the indium is desorbed substantially simultaneous with the sulfuric acid as shown in FIG. 5, and its behavior resembles that of the hydrochloric acid and iron that is shown in FIG. 8. Also, the elution that is obtained by eluting with nitric acid does not adsorb to the anion-exchange resin, as shown in FIG. 6, and this resembles the behavior of general metal salts.

In other words, in the sulfuric acid solution the indium likely forms a sulfate ($In_2(SO_4)_3$) with the sulfuric acid in the same manner that iron is generally known to behave in solutions of hydrochloric acid. In solutions of nitric acid, metals are generally known to complex with water, and indium, too, forms an aquo complex ($[In(H_2O)_n]^{3+}$, where $1 \leq n \leq 6$ and n is an integer) in nitric acid solution, and it is likely that this is the reason behind why indium is not adsorbed. By contrast, in a solution of hydrochloric acid, indium exhibits the same behavior as that of silica, and therefore it can be presumed that the indium is ionized to an anion and forms an indium chloride complex ($[In(Cl)_n]^{3-n}$, where $1 \leq n \leq 6$ and n is an integer), and it is likely that precisely because it takes this form in hydrochloric acid solution, indium can specifically adsorb to an anion-exchange resin that has an acid-adsorbing ability only when the indium has been eluted with an acid solution whose primary component is hydrochloric acid.

Working Example 2

100 g of cutlet obtained by cutting/grinding a liquid crystal panel into approximately 5-mm size units were placed in separate 500 mL hydrochloric acid solutions (3.5% HCl) and the temperature of these was set to 30, 40, 50, 60, 70, 80, and 90° C., respectively, and agitated for 90 minutes, after which the indium content of the hydrochloric acid solution was examined.

The results of this examination are shown in FIG. 9 and reveal that the recovery rate of indium recovered in the hydrochloric acid solution is at least 35% after agitation at 30° C. or more, and 50% or more after agitation at 60° C. or more. At 90° C., hydrogen chloride gas was generated. Thus, it was found that it is particularly preferable to carry out the elution between 60 and 80° C. in order to obtain a recovery rate of 50% or more.

Working Example 3

100 g of cutlet obtained by cutting/grinding a liquid crystal panel into approximately 5-mm size units was placed in 500 mL hydrochloric acid (3.5% HCl) and agitated for 90 minutes at 80° C., after which the insoluble matter was removed by filtration, yielding a hydrochloric acid solution containing ITO. This hydrochloric acid solution was passed through a column ($\phi$20 mm×250 mm H) packed with 60 g of a gel anion-exchange resin with a crosslinked structure produced by copolymerizing styrene and divinylbenzene, and that has trimethylammonium groups, at a rate of LV=1.5 m/h. Pure water was then passed through the column in the same direction as that in which the hydrochloric acid solution was passed through, and every 5 mL a sample of the solution that had passed through the column was taken and the chlorine ion concentration, which indicates the acid concentration, and the indium ion concentration were measured. The results are shown in FIG. 10, and from these results it was clear that when the acid concentration starts to drop significantly, the concentration of the indium has become high. In other words, it was found that by measuring the acid concentration, it is possible to fraction the liquid that has passed through the column into an acid recovery liquid and an indium recovery liquid.

Working Example 4

200 g of cutlet obtained by cutting/grinding a liquid crystal panel into approximately 5-mm size units was placed in 500 mL concentrated hydrochloric acid (35% HCl) and agitated for 60 minutes at 80° C., after which the insoluble matter was removed by filtration, yielding a hydrochloric acid solution containing ITO. Using this hydrochloric acid solution, the ion concentration after the hydrochloric acid solution and the water had been passed through the column was measured through the same procedure as in Working Example 1. The results are shown in FIG. 11, and from the results it was understood that fractioning can be performed favorably even when the indium is in a concentrated hydrochloric acid solution.

However, in the case of a concentrated hydrochloric acid solution, some adsorption of aluminum also is seen, and thus it is more preferable for a dilute hydrochloric acid solution to be used.

Working Example 5

The change in the indium ion concentration and the tin ion concentration in the indium recovery liquid was measured in a case where the pH of the indium recovery liquid obtained in Working Example 3 was changed from 1 to 10. The results are shown in FIG. 12, and from the results it can be understood that the tin precipitates as tin hydroxide when the pH becomes greater than 2, and the indium begins to precipitate as indium hydroxide when the pH becomes greater than 4. It was clear that by adjusting the pH, it is possible to separate indium and tin.

Working Example 6

100 g of cutlet obtained by cutting/grinding a liquid crystal panel into approximately 5-mm size units was placed in 500 mL hydrochloric acid (3.5% HCl) and agitated by rotary evaporator for 60 minutes at 80° C., after which the insoluble matter was removed by filtration to yield a hydrochloric acid solution containing ITO. 100 g of the cutlet was added to this hydrochloric acid solution at a time, and the same operation was repeated nine times. The composition of the hydrochloric acid solution thus obtained is shown in Table 1.

TABLE 1

Composition of the Acidic Solution (mg/L)

| In | Al | Sn | Cl |
|---|---|---|---|
| 516 | 130 | 42.6 | 34475 |

This hydrochloric acid solution was processed using the same method as in Working Example 3, yielding an indium recovery liquid. The composition of the indium recovery liquid was analyzed, and the results are shown in Table 2.

TABLE 2

Composition of the Indium Recovery Solution (mg/L)

| In | Al | Sn | Cl |
|---|---|---|---|
| 1324.5 | 5.2 | 6.3 | 8400 |

Sodium hydroxide was added to the indium recovery solution to adjust the pH to 2, and this was agitated for 30 minutes. Then, a polymer coagulant was added and the precipitate that was obtained was removed by filtration. Additional sodium hydroxide was added to the filtrate to adjust the pH to 5, and this was agitated for 30 minutes. The precipitate that was obtained was recovered by filtration and dried, and its composition was analyzed. As shown in Table 3, it was found that it is possible to obtain high-purity indium.

TABLE 3

Composition of the Indium Sludge (mg)

| In | Al | Other (crystal water, etc.) |
|---|---|---|
| 382.1 | 0.4 | 67.4 |

Working Example 7

200 g of cutlet obtained by cutting/grinding a liquid crystal panel into approximately 5-mm size units was placed in 500 mL of a mixture acid (5 mol/L HCl+0.25 mol/L $HNO_3$) and agitated by rotary evaporator for 60 minutes at 80° C., after which the insoluble matter was removed by filtration to yield a mixture acid solution containing ITO. 200 g of the cullet was added to this mixture acid solution at a time, and the same operation was repeated five times. The composition of the mixture acid solution thus obtained is shown in Table 4.

TABLE 4

Composition of the Mixture Acid Solution (mg/L)

| In | Al | Sn | Si |
|---|---|---|---|
| 537 | 382 | 63.5 | 50.8 |

Using this mixture acid solution, the ion concentration after the mixture acid solution and the water had passed through the column was measured by the same procedure as in Working Example 1. The results are shown in FIG. 13, and from the results it was understood that in a case where a mixture acid solution is used, indium is not desorbed when the solution is passed through or at first when water is passed through, and thus indium can be more favorably separated than in the case of FIG. 3, in which hydrochloric acid solution is used.

Table 5 compares the indium adsorption and desorption rates with those of Working Example 1. That is, it was found that the mixture acid solution has an excellent ability to isolate indium and the acid recovery hardly includes any indium, and the content of Al, which is an impurity, also is lower.

It should be noted that it is presumed that the total desorption rates above 100% are due to experimental error.

TABLE 5

| Elution Acid | Adsorption Rate | Desorption Rate (amount desorbed/amount adsorbed) | | | Al Impurities Content |
|---|---|---|---|---|---|
| | | Acid Recovery | Desorption | Total Desorption | |
| HCl | 100% | 30.6% | 70.7% | 101.3% | 1.27% |
| Mixture Acid | 100% | 0.2% | 100.7% | 100.9% | 0.31% |

Working Example 8

200 mg IZO was placed in 200 mL mixture acid (5 mol/L HCl+0.25 mol/L HNO$_3$), and a mixture acid solution was obtained by the same method as in Working Example 7. Using this mixture acid solution, the ion concentration after the mixture acid solution and the water had passed through the column was measured by the same procedure as in Working Example 1. The results are shown in FIG. 14, and from the results it was found that zinc and indium produce the same curve and that zinc is adsorbed and desorbed as a chloride complex like indium.

Working Example 9

200 mg IZO was placed in 200 mL mixture acid (5 mol/L HCl+0.25 mol/L HNO$_3$), and a mixture acid solution was obtained by the same method as in Working Example 7. The change in the indium ion concentration and the zinc ion concentration in the IZO mixture acid solution was measured as the pH of the mixture acid solution was changed from 3 to 9.

The result was that, as shown in FIG. 15, the indium begins to precipitate as indium hydroxide when the pH becomes higher than 4.5, and has precipitated completely when the pH reaches 5.5. Then, the zinc begins to precipitate as zinc hydroxide when the pH becomes higher than 8.5, and has precipitated completely when the pH reaches 9.5.

From the above it was understood that by adjusting the pH of the solution, it is possible to separate indium and zinc like in the case of ITO, and indium can be recovered with high-purity.

INDUSTRIAL APPLICABILITY

The present invention can by adopted for the recovery of indium from an acid solution whose primary component is hydrochloric acid. In particular, it can be used for the recovery of indium from acid solutions of the transparent conducting films used in an FPD panel, the ITO attached matter or the IZO attached matter that occur due to sputtering, or leadless solder that includes indium, for example, as well as the etching waste liquid of the conducting film and the wash waste liquid of the chamber. It can also be utilized for the recovery of acid.

Figure 1:
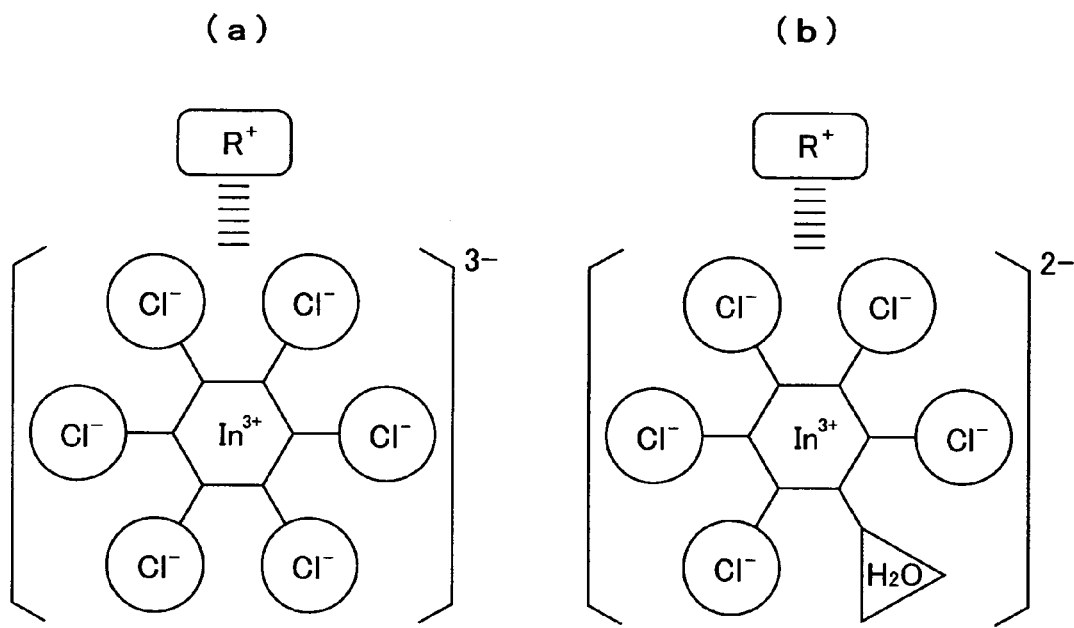
FIG. 1(a) is a diagram that describes the adsorption mechanism of indium in a hydrochloric acid solution.
FIG. 1(b) is a diagram that describes the adsorption mechanism of indium in an hydrochloric acid solution containing nitric acid.
Figure 2:
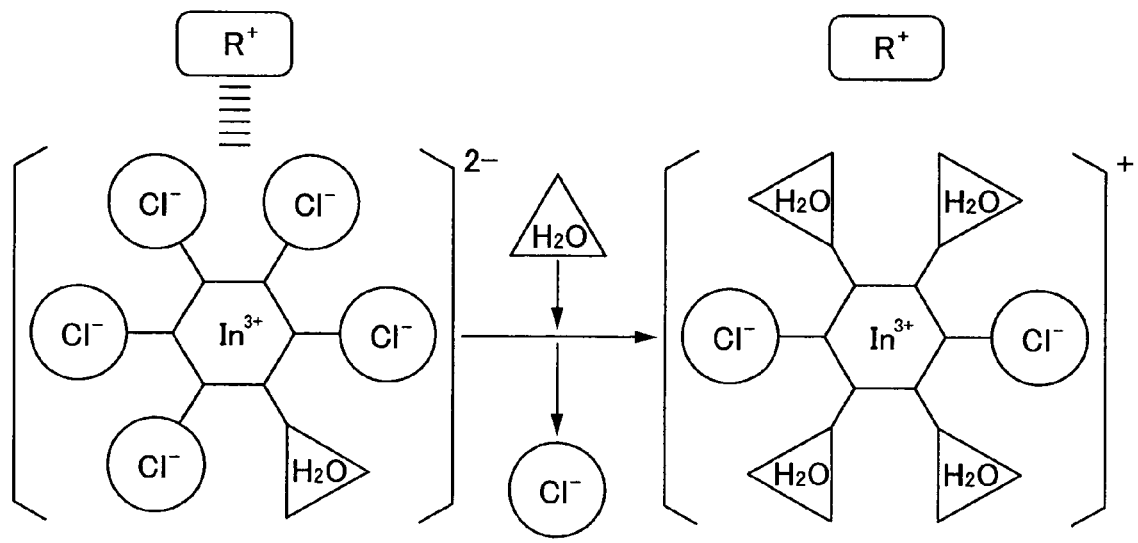
FIG. 2 is a diagram that describes the desorption mechanism of indium.
Figure 3:
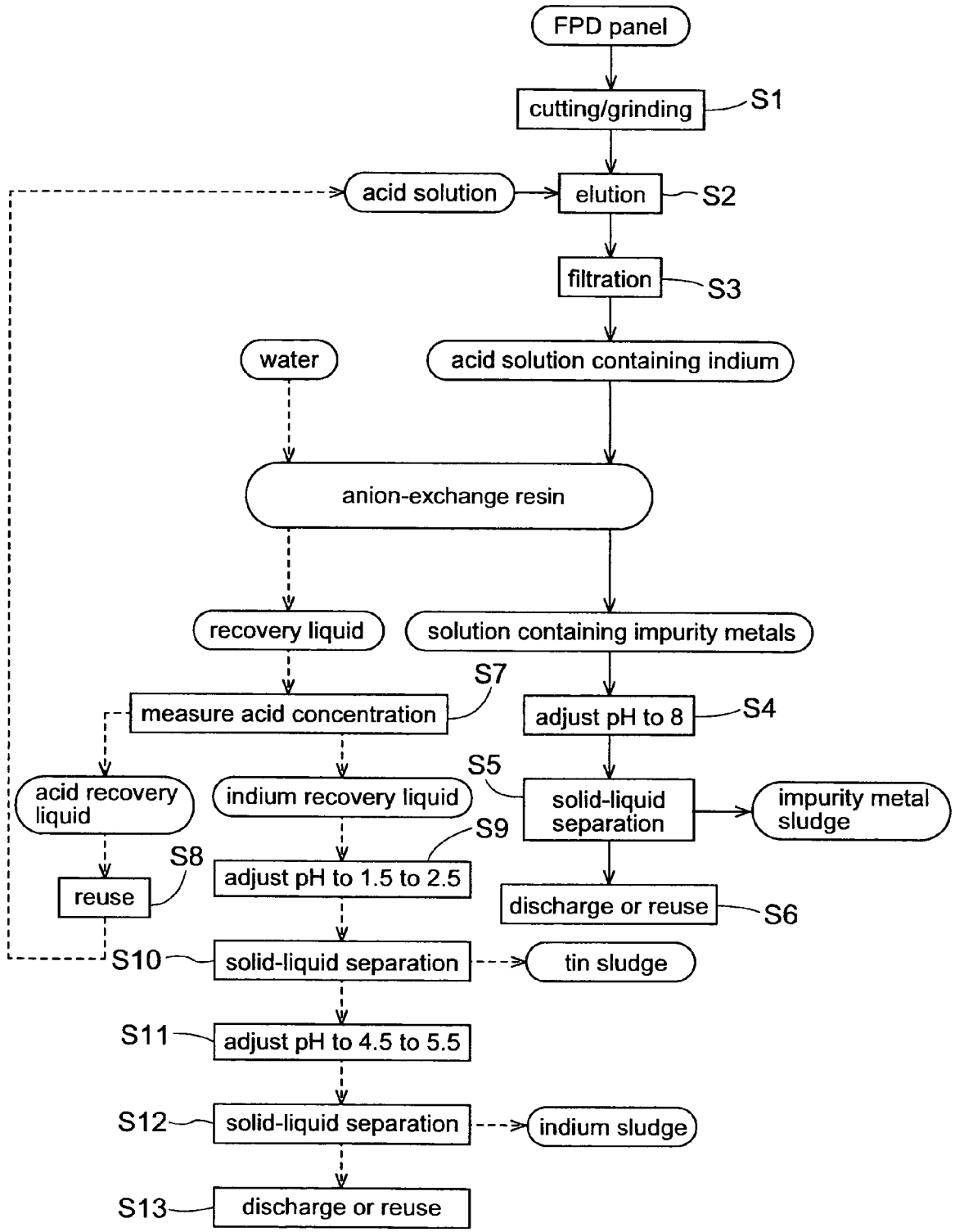
FIG. 3 is a diagram that describes an embodiment of the indium recovery method.
Figure 4:
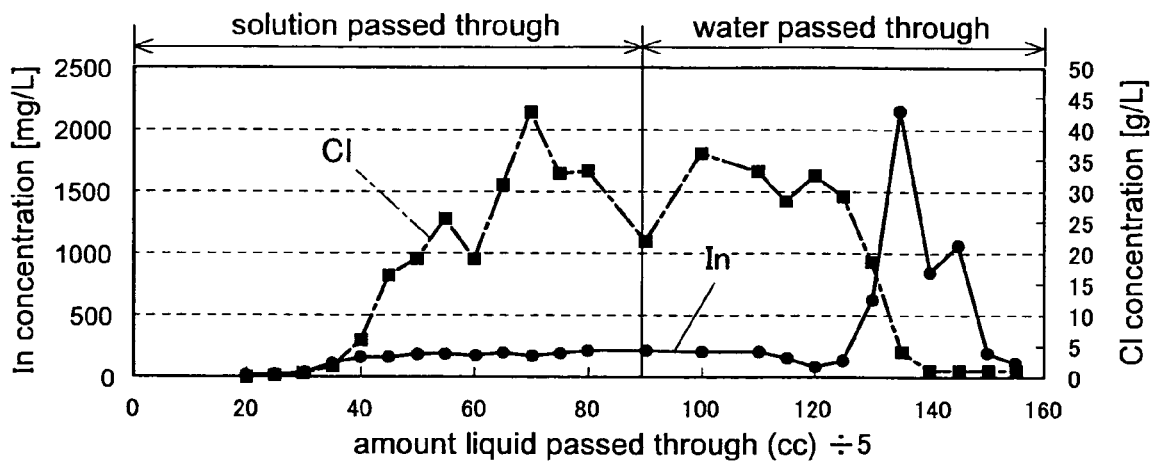
FIG. 4 is a graph showing the behavior of indium in a hydrochloric acid solution.
Figure 5:
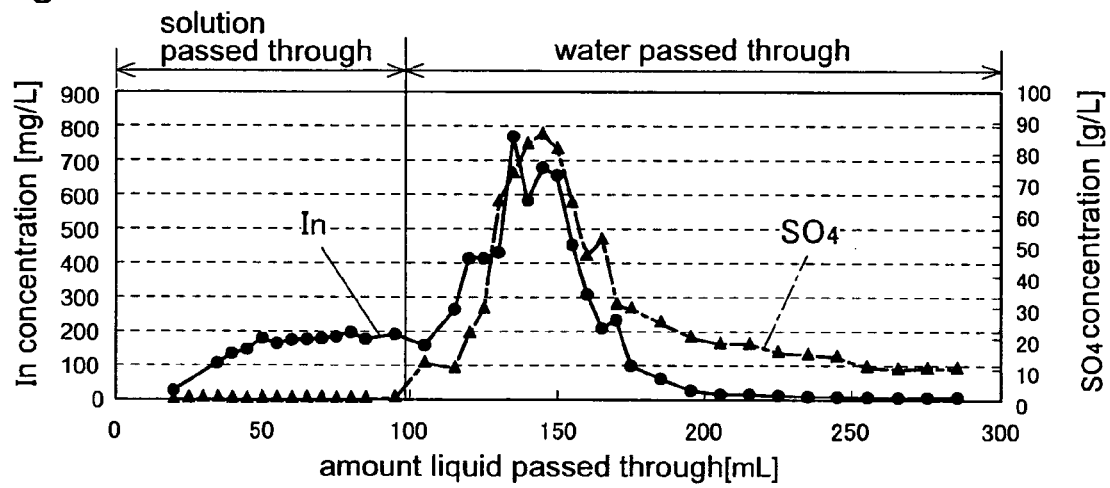
FIG. 5 is a graph showing the behavior of indium in a sulfuric acid solution.
Figure 6:
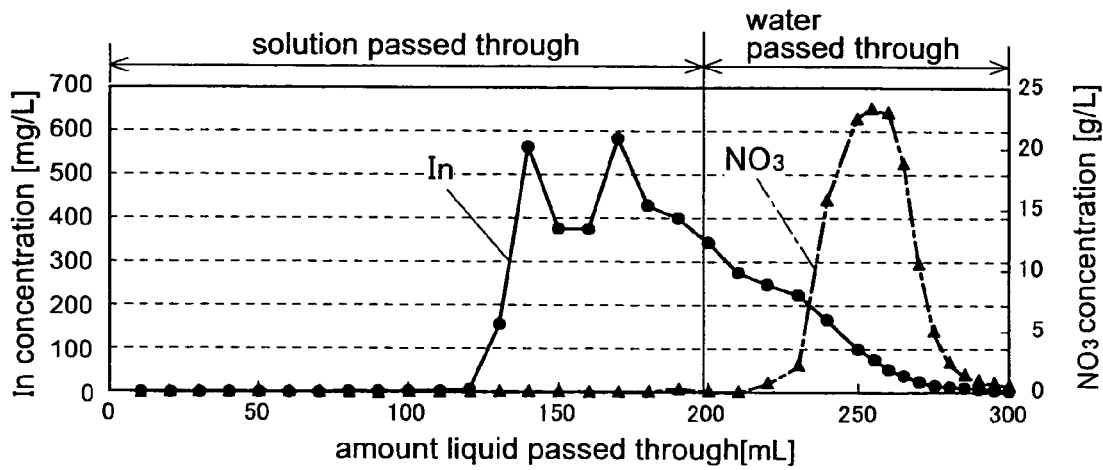
FIG. 6 is a graph showing the behavior of indium in a nitric acid solution.
Figure 7:
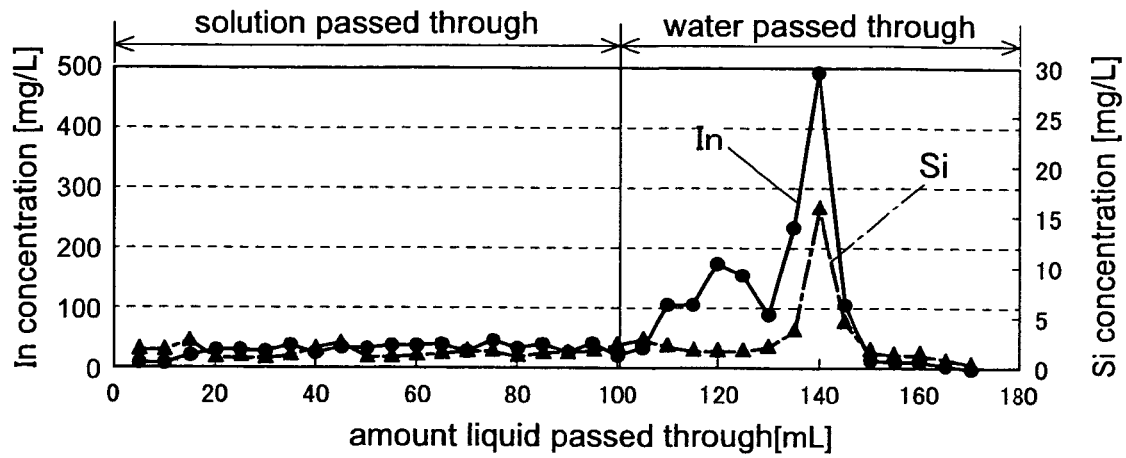
FIG. 7 is a graph showing the behavior of silica in a hydrochloric acid solution.
Figure 8:
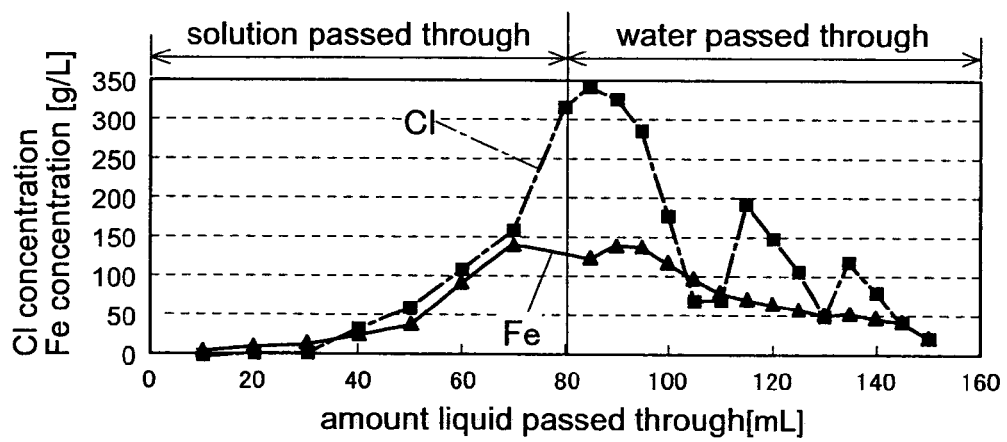
FIG. 8 is a graph showing the behavior of iron in a hydrochloric acid solution.
Figure 9:
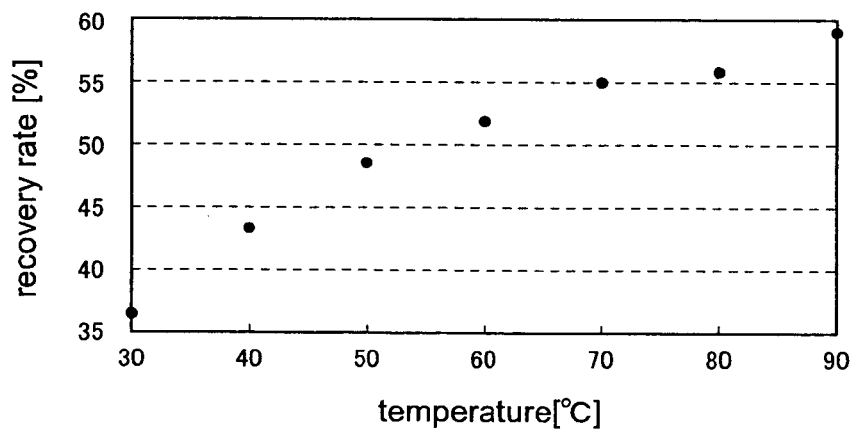
FIG. 9 is a graph showing the relationship between the temperature and the recovery rate.
Figure 10:
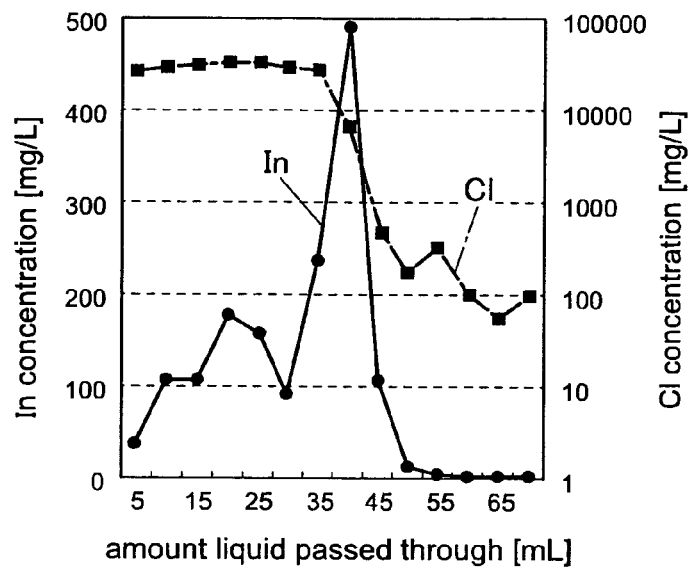
FIG. 10 is a graph showing the relationship between the acid concentration and the indium iron ion concentration.
Figure 11:
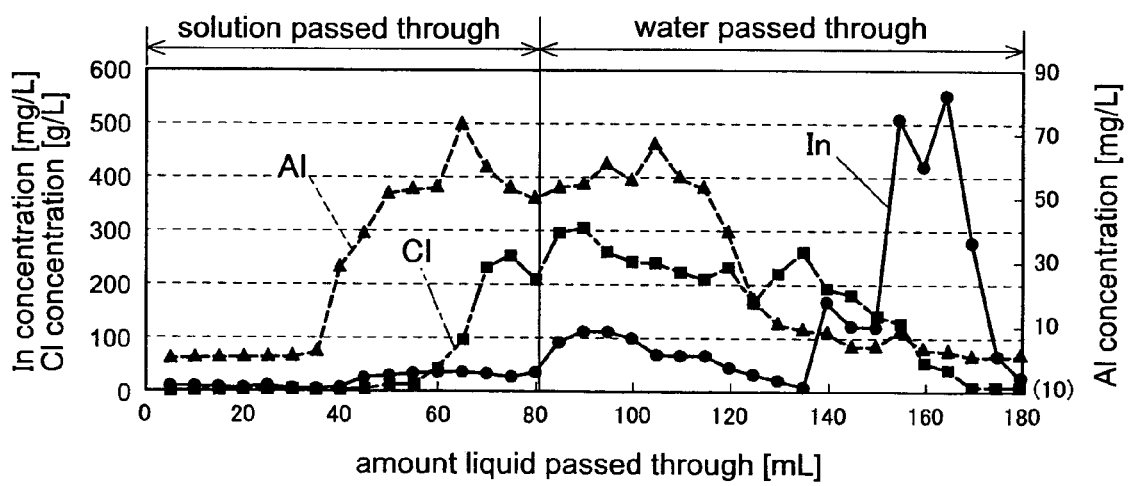
FIG. 11 is a graph showing the behavior of indium in concentrated hydrochloric acid solution.
Figure 12:
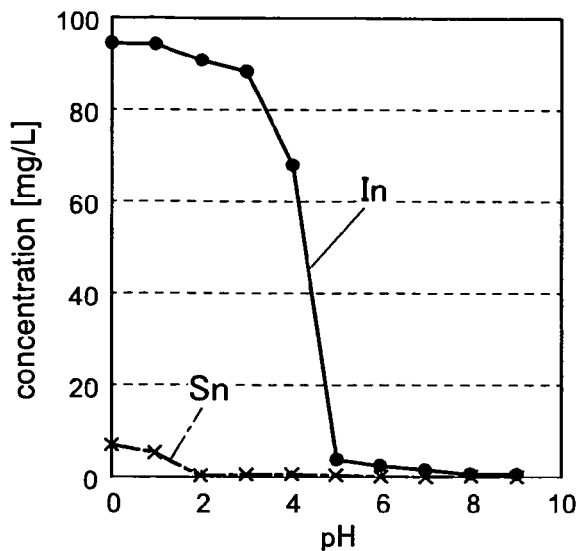
FIG. 12 is a graph showing the relationship between the pH and the indium ion concentration.
Figure 13:
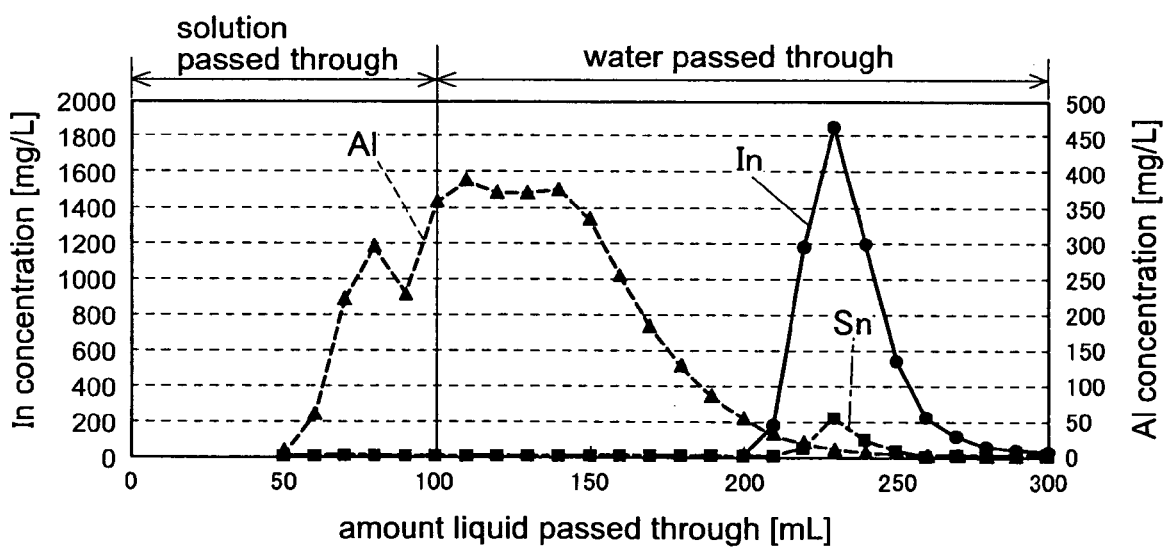
FIG. 13 is a graph showing the behavior of indium in a mixture acid solution.
Figure 14:
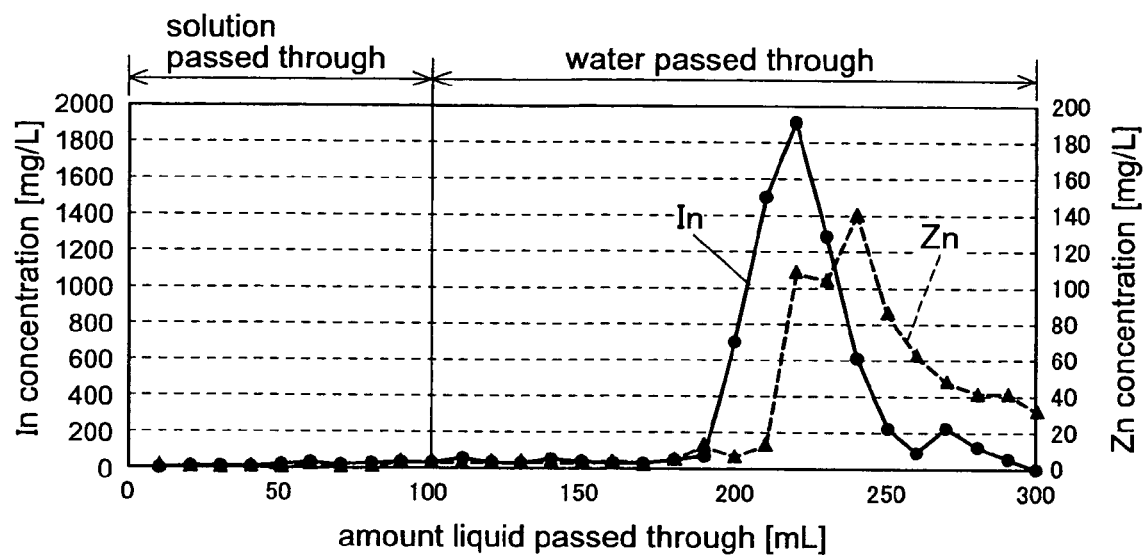
FIG. 14 is a graph showing the behavior of indium in a mixture acid solution.
Figure 15:
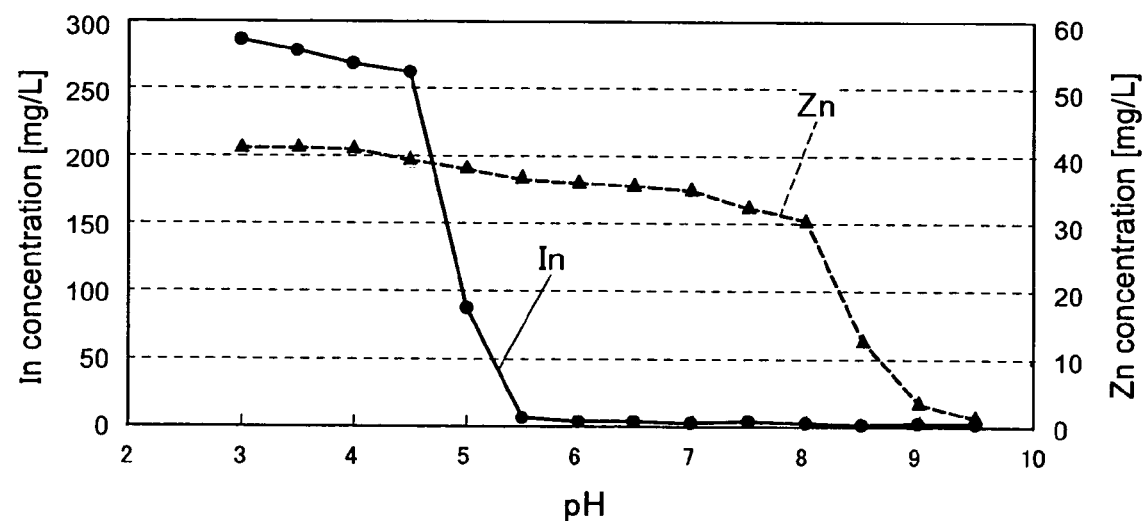
FIG. 15 is a graph showing the relationship between the pH, the indium ion concentration, and the zinc ion concentration.

The invention claimed is:

1. An indium fractioning method comprising:
bringing an acid solution that has hydrochloric acid as a primary component and that contains indium into contact with an anion-exchange resin that has a crosslinked structure produced by copolymerization of styrene or acrylamide and divinylbenzene, and at least one of a quaternary ammonium group and a tertiary ammonium group, and that is provided with an acid-adsorbing ability, so as to cause indium to adsorb to the anion-exchange resin; and
after indium has been adsorbed onto the anion-exchange resin, bringing the anion-exchange resin into contact with water so as to desorb the indium from the anion-exchange resin, yielding an indium recovery liquid.

2. The indium fractioning method according to claim 1, wherein an acid concentration of the effluent after contact with the anion-exchange resin is measured, and an acid recovery liquid and the indium recovery liquid are fractioned off based on the change in its concentration.

3. The indium fractioning method according to claim 1, wherein the pH of the indium recovery liquid is adjusted so as to recover the indium as indium hydroxide.

4. The indium fractioning method according to claim 2, wherein the pH of the indium recovery liquid is adjusted so as to recover the indium as indium hydroxide.

5. The indium fractioning method according to claim 3, wherein the indium hydroxide that has been recovered is dried or eluted with acid.

6. The indium fractioning method according to claim 4, wherein the indium hydroxide that has been recovered is dried or eluted with acid.

7. The indium fractioning method according to claim 1, wherein the acid solution is at least one of a solution obtained by eluting, with an acid whose primary component is hydrochloric acid, a conducting film of a flat panel display, ITO attached matter or IZO attached matter that occur due to sputtering, or leadless solder that includes indium, an etching waste liquid of the conducting film, and a wash waste liquid of a chamber.

8. The indium fractioning method according to claim 2, wherein the acid solution is at least one of a solution obtained by eluting, with an acid whose primary component is hydrochloric acid, a conducting film of a flat panel display, ITO attached matter or IZO attached matter that occur due to sputtering, or leadless solder that includes indium, an etching waste liquid of the conducting film, and a wash waste liquid of a chamber.

9. The indium fractioning method according to claim 3, wherein the acid solution is at least one of a solution obtained by eluting, with an acid whose primary component is hydrochloric acid, a conducting film of a flat panel display, ITO attached matter or IZO attached matter that occur due to sputtering, or leadless solder that includes indium, an etching waste liquid of the conducting film, and a wash waste liquid of a chamber.

10. The indium fractioning method according to claim 4, wherein the acid solution is at least one of a solution obtained by eluting, with an acid whose primary component is hydrochloric acid, a conducting film of a flat panel display, ITO attached matter or IZO attached matter that occur due to sputtering, or leadless solder that includes indium, an etching waste liquid of the conducting film, and a wash waste liquid of a chamber.

11. The indium fractioning method according to claim 5, wherein the acid solution is at least one of a solution obtained by eluting, with an acid whose primary component is hydrochloric acid, a conducting film of a flat panel display, ITO attached matter or IZO attached matter that occur due to sputtering, or leadless solder that includes indium, an etching waste liquid of the conducting film, and a wash waste liquid of a chamber.

12. The indium fractioning method according to claim 6, wherein the acid solution is at least one of a solution obtained by eluting, with an acid whose primary component is hydrochloric acid, a conducting film of a flat panel display, ITO attached matter or IZO attached matter that occur due to sputtering, or leadless solder that includes indium, an etching waste liquid of the conducting film, and a wash waste liquid of a chamber.

13. The indium fractioning method according to claim 1, wherein the acid solution is a mixture acid solution that includes nitric acid.

14. The indium fractioning method according to claim 2, wherein the acid recovery liquid is used for eluting at least one of a conducting film of a flat panel display, ITO attached matter or IZO attached matter that occur due to sputtering, or leadless solder that includes indium, or is used for washing a chamber.

15. The indium fractioning method according to claim 7, wherein the acid solution is a mixture acid solution that includes nitric acid.

* * * * *

UNITED STATES PATENT AND TRADEMARK OFFICE
CERTIFICATE OF CORRECTION

| | | |
|---|---|---|
| PATENT NO. | : 7,611,631 B2 | Page 1 of 1 |
| APPLICATION NO. | : 11/631898 | |
| DATED | : November 3, 2009 | |
| INVENTOR(S) | : Ohnishi et al. | |

It is certified that error appears in the above-identified patent and that said Letters Patent is hereby corrected as shown below:

Title Page, See Item (75) Inventors:

The first named inventor, "Akifusai Ohnishi" should read -- Akifusa Ohnishi --

Signed and Sealed this

Sixteenth Day of March, 2010

David J. Kappos
*Director of the United States Patent and Trademark Office*